Aug. 6, 1929.  A. O. AUSTIN  1,723,836
CONNECTING MEANS FOR CABLES OR THE LIKE
Filed March 1, 1923   2 Sheets-Sheet 1
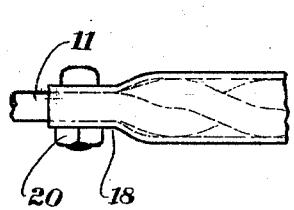 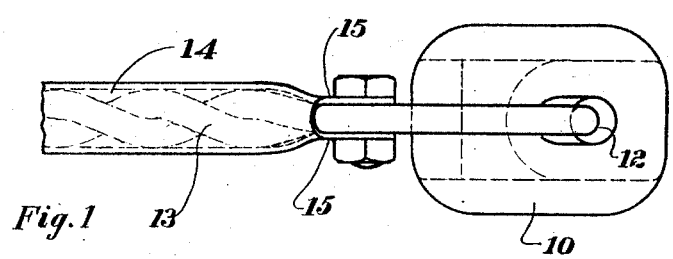
Fig.1
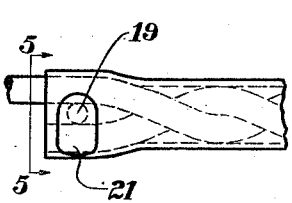 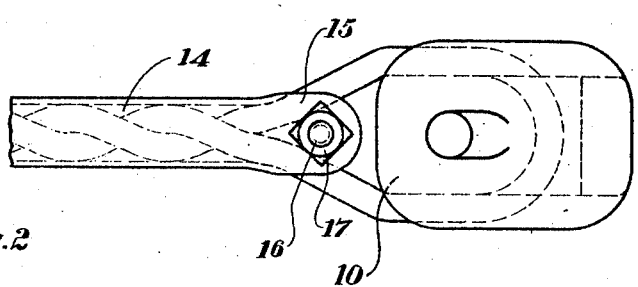
Fig.2
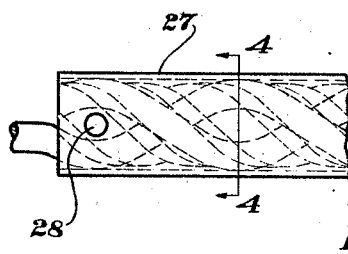 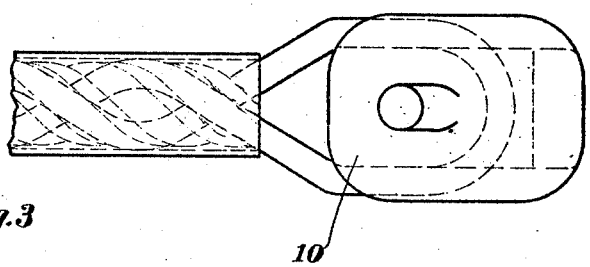
Fig.3
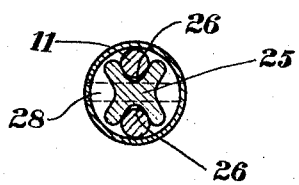 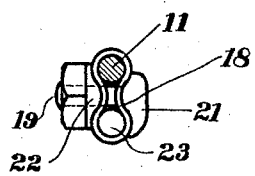
Fig.4   Fig.5
INVENTOR
Arthur O. Austin
BY
Nissen & Crane
ATTORNEY Aug 6, 1929.　　　　A. O. AUSTIN　　　　1,723,836
CONNECTING MEANS FOR CABLES OR THE LIKE
Filed March 1, 1923　　　2 Sheets-Sheet 2
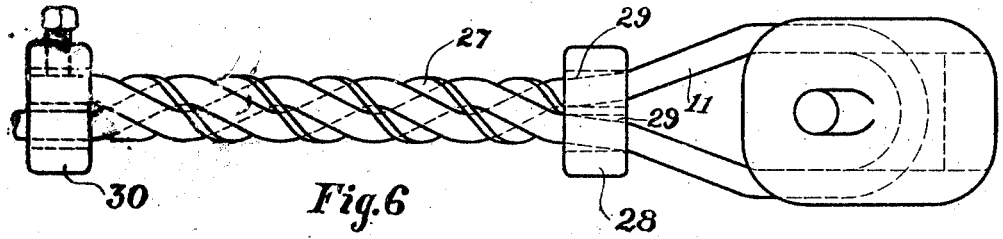
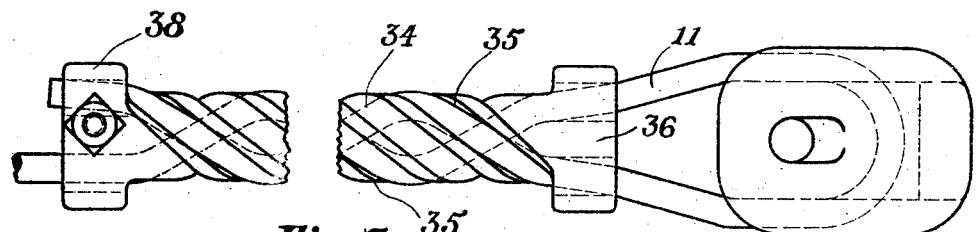
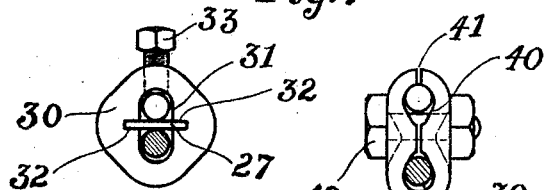 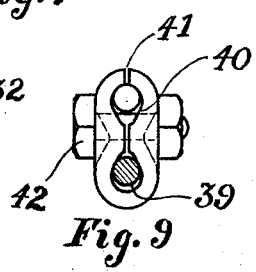
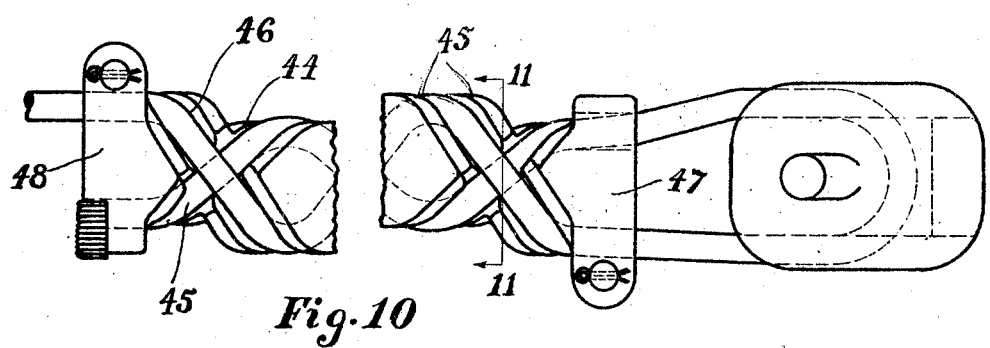
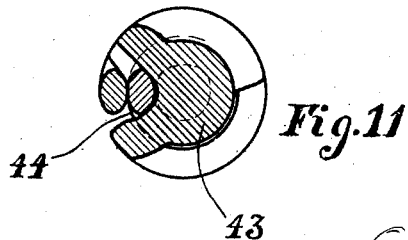
INVENTOR
Arthur O. Austin
BY Nissen & Crane
ATTORNEY Patented Aug. 6, 1929.

1,723,836

UNITED STATES PATENT OFFICE.

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY.

CONNECTING MEANS FOR CABLES OR THE LIKE.

Application filed March 1, 1923. Serial No. 621,976.

This invention relates to means for securing looped ends of cables, conductors, guy wires and similar devices to insulators or other supports, and has for its object the provision of a securing means which shall be economical, efficient and easy to install.

The invention is exemplified in the combination and arrangement of parts shown in the accompanying drawings and described in the following specification, and it is more particularly pointed out in the appended claims.

In the drawings:

Fig. 1 is a plan view of a connection embodying one form of the present invention.

Fig. 2 is an elevation of the parts shown in Fig. 1.

Fig. 3 is a view similar to Fig. 2, showing a modified form of the invention.

Fig. 4 is a section on line 4—4 of Fig. 3.

Fig. 5 is a section on line 5—5 of Fig. 2.

Fig. 6 is an elevation of another modification of the invention.

Fig. 7 is an elevation of a different form.

Fig. 8 is an end view looking from the right in Fig. 6.

Fig. 9 is an end view looking from the right in Fig. 7.

Fig. 10 is an elevation of a different modification.

Fig. 11 is a section on line 11—11 of Fig. 10.

As shown in the drawings, the numeral 10 represents an insulator similar to that shown in my design Patent No. 59,947 to which a guy wire, cable, conductor or other connector 11 is secured. It will be understood that the invention is applicable to other forms of connections in which looped ends of flexible or semi-flexible members are present. The cable 11 is threaded thru an opening 12 in the insulator 10, the free end being brought back upon the cable and the two adjacent parts twisted together as shown at 13. A pipe or tubular member 14 surrounds the twisted portions of the cable; one end of the pipe is slotted to form ears 15 which grip the cable where it separates to pass thru the insulator 10. A bolt 16 extends thru perforations in the ears 15 and is provided with a nut 17 for clamping the ears firmly against the cable; the opposite end of the pipe 14 is flattened as shown at 18 against the two portions of the cable and a bolt 19 passes thru perforations of the flattened portion of the pipe and is provided with a nut 20 for clamping the pipe firmly against the cable.

As shown in Fig. 5 the bolt 19 is provided with a gripping head 21 and a washer 22 which firmly grasps the flattened portion of the pipe 14 to hold the same against the free end 23 of the cable 11. The torsional stress due to the load on the cable will be resisted by the rigidity of the pipe 14, which should therefore be of sufficient strength to prevent unwinding of the twisted portion of the cable. The load on the cable 11 will, of course, tend to draw the cable about its anchorage on the insulator 10. The tension on the free end will be largely overcome by the snubbing effect due to the friction between the twisted portions of the cable. A very slight clamping action on the free end of the cable at 23 is all that is necessary to prevent slipping of the cable since the force is substantially overcome by the frictional resistance at the points of contact of the twisted parts.

In the form of the invention shown in Figs. 3 and 4, a central core member 25 is interposed between the overlapping portions of the cable 11, the member being provided with oppositely grooved seats 26 which receives the cable. The core 25 has a twisted shape so that grooves 26 take the form of helices and the snubbing effect occurs between the cable and the grooved seats in the core member. This member should be sufficiently stiff to resist the unwinding action of the cable due to the tension of the load. Under load the cable will be drawn into the grooves so that the friction will be proportional to the load the same as in the form illustrated in Figs. 1 and 2.

In order to prevent escape of the cable from the friction grooves when the cable is slack, a tube or pipe 27 surrounds the core member and cable wound on, and this pipe may be held from longitudinal movement by a pin 28 fastened thru the pipe and core member. This pipe will also serve to hold the free end of the cable in place in its groove, and prevent unwinding of the cable from this end.

In the form shown in Fig. 6 a sheet or strip of metal 27 is interposed between the over-lapping portions of the cable 11, a strip being twisted in formation like the bit of an auger to provide helical grooves on the opposite side thereof for receiving cable parts. The end of the strip 27' adjacent the loop of the cable is provided with a rigid head 28 having openings 29 thru which the cables pass. The opposite end of the strip 27' is provided with a holding clip 30, having a central slot 31 for receiving the cables, the slot having lateral notches 32 and receiving the flat end of the metal strip 27'. A set screw 33 locks the cable in the clamp member 30 in the form of the invention shown in Figs. 6 and 8.

In the form shown in Figures 7 and 9ᵃ core member 34 is provided with oppositely disposed helical grooves 35 for receiving the portions of the cable 11 so that the cables are held in spaced relation to one another, giving a larger diameter to the core member and providing additional snubbing friction surface. The inner end of the core is provided with a head 36 similar to that shown in Fig. 6. The opposite end has a head 38 formed thereon, having recesses 39 and 40 for the cable, the head being slit at one side, as shown at 41, and clamped together by a bolt 42 to hold the free end of the cable in place and prevent unwinding.

In the form shown in Figs. 10 and 11, a core member 43 is provided with a grooved recess 44 of helical form for receiving the free end 45 of the cable, while a pair of guides 45' project outwardly from the core member to form a helical groove 46 for the load end of the cable. Heads 47 and 48 are provided on the opposite ends of the core member and the over-lapping portions of the cables are wound in opposite directions on the core, as shown in Fig. 10. Because of the opposite direction of the windings, the tendency to unwind under the stress of the load is largely overcome.

I claim:

1. In combination a cable having a portion thereof looped about a holding member and carried back upon itself, providing over-lapping portions continuous with each other about said holding member, said portions of said cable being twisted about one another to provide frictional action to retain said cable in looped position, and a rigid member extending longitudinally of said twisted portions and secured thereto at spaced positions to prevent untwisting of the cable.

2. In combination a cable having a portion thereof looped about a holding member and carried back upon itself, forming overlapping portions continuous with each other, the over-lapping portions of said cable being twisted about one another and a tube enclosing said twisted portions and secured thereto at spaced positions to prevent untwisting thereof.

3. The combination with a holding member of a cable threaded thru an opening therein and carried back upon itself, forming overlapping portions continuous with each other, the over-lapping parts being twisted together and a torsion member extending longitudinally of said twisted portions and secured thereto at spaced positions to prevent untwisting of said portions.

4. In combination a cable having the end portion thereof doubled back upon itself to form a loop, the over-lapping portions of said cable being twisted together so that the friction between said portions resist slipping of said cable and a torsion member having one end thereof clamped to said cable adjacent said loop, and the opposite end thereof clamped to the free end of said cable to prevent unwinding thereof.

5. In combination a holding member, a cable looped about said insulator and carried back along itself, the over-lapping portions of said cable being twisted together so that the friction between said contact portions resists sliding of said cable upon said holding member, a pipe enclosing the twisted portions of said cable and having ears fixed thereto adjacent said insulator, means for clamping said ears against the portions of said cable extending toward said insulator, the opposite end of said pipe being flattened and a clamping member for causing the flattened portion of said pipe to grip the free end of said cable.

6. In combination, a cable having a portion thereof looped about a holding member and carried back upon itself, forming overlapping portions continuous with each other, the overlapping portions of said cable being twisted about each other to provide frictional engagement to retain said cable in looped position, and a rigid device attached to the overlapping portions of said cable at spaced positions thereon to hold said overlapping portions from untwisting under the tension exerted by a load on the free end of said cable.

7. In combination, a cable having a portion thereof looped about a holding member and carried back upon itself providing overlapping portions continuous with each other, one of said overlapping portions being helically wound about an axis extending in the direction of said cable, and a torsion member extending longitudinally of said overlapping portions and fixed to said overlapping portions at points spaced longitudinally thereof to hold said helically wound portion from unwinding.

8. In combination, a cable, a holding member about which said cable passes, the free end of said cable being carried backwardly and wound in a helix about an axis extending in the direction of said cable, and a torsion member extending longitudinally of the overlapping portions of said cable and secured to said overlapping portions at spaced points along the length thereof for preventing unwinding of said free end.

In testimony whereof I have signed my name to this specification on this 24th day of February, A. D. 1923.

ARTHUR O. AUSTIN.